June 29, 1965   F. H. WILKEN ETAL   3,191,566
WATER-BORNE TAKE-OFF AND LANDING CRAFT FOR AIRCRAFT
Filed Feb. 21, 1964
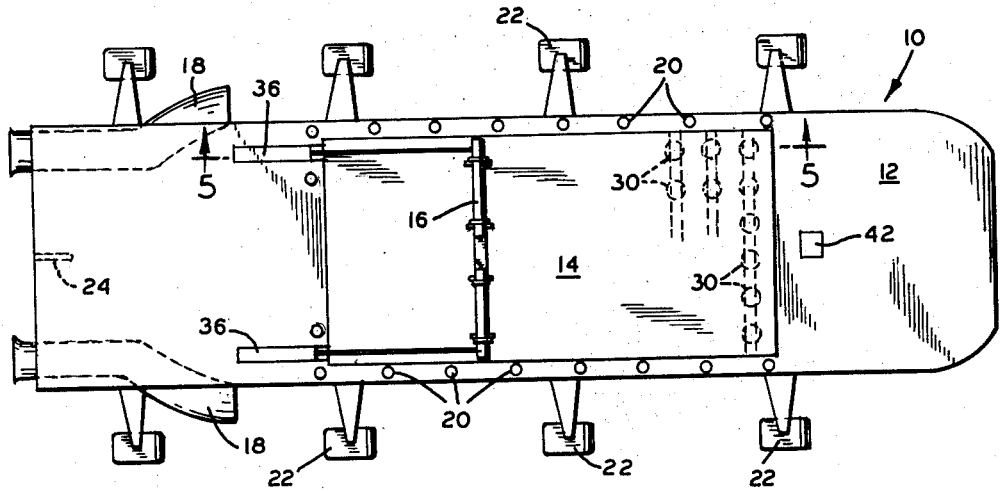
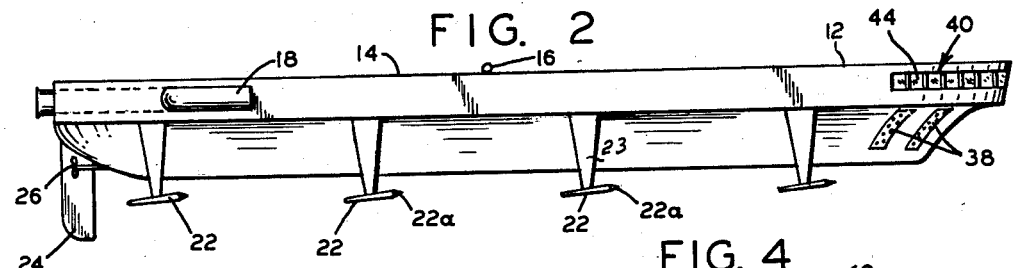
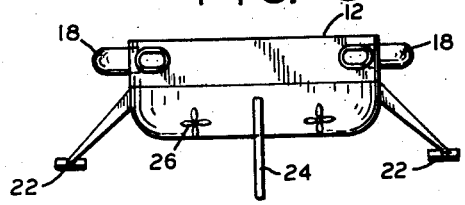
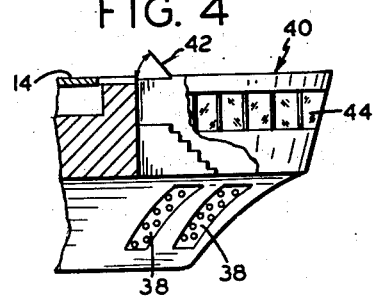
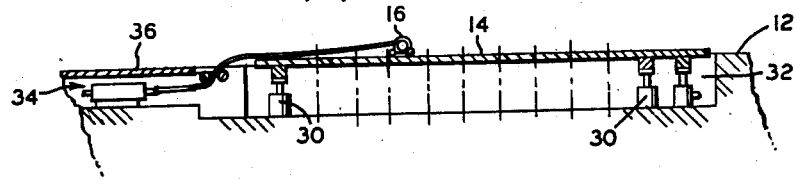
INVENTORS.
FRED H. WILKEN
HERMAN ROBERTS
BY
JOHN P. CHANDLER
THEIR ATTORNEY.

United States Patent Office 3,191,566
Patented June 29, 1965

3,191,566
WATER-BORNE TAKE-OFF AND LANDING
CRAFT FOR AIRCRAFT
Fred H. Wilken, 59 Mountain View Road, and Herman Roberts, 7 Heather Hill Road, both of Demarest, N.J.
Filed Feb. 21, 1964, Ser. No. 346,460
3 Claims. (Cl. 114—43.5)

This invention relates to a water-borne structure for the landing and take-off of aircraft and has for its principal object the provision of an arrangement which will solve the ever-increasing problem of airport facilities in crowded urban areas where the supply of available land is in inverse proportion to the need and the situation grows more critical each day.

The attainment of greater flying speeds and the vast increase in the number of aircraft have resulted in requirements for longer runways, superior paving materials, new engineering techniques and larger and more numerous airport facilities.

In most coastal, as well as inland areas, there is a body of water of sufficient size for the water-borne facility of the present invention and it is, therefore, an object of the present invention to provide a mobile, readily maneuverable structure which will travel over the water at the same speed as that required for take-off and landing and which will permit the craft to safely take-off and land in any direction relative to the prevailing wind.

Another object of the invention is to provide a landing and take-off water-borne craft for airplanes capable of attaining the normal speed of the plane and employing the hydrofoil principal and powered by jet engines. The hull of the craft is so shaped as to be maneuverable in water like a conventional ship when traveling at low speed up to 20 knots. The combined hull and aircraft power plants are used to attain aircraft take-off speed to permit the aircraft to separate from the hull.

A landing aircraft will approach the water runway upwind at its landing velocity of about 120 knots similar to the approach on a conventional runway. The hydrofoil hull is moving along the water "runway" at a speed equal to the aircraft. By electronic controls, both hull and aircraft will maneuver to permit the aircraft to settle on the hull. One of the reasons why it has never been feasible earlier to provide a water-borne "landing field" for aircraft was because (a) it was not possible to produce a craft with a running speed as high as the landing airplane, and to have the ship running at a lesser speed would inevitably result in spilling the aircraft into the sea unless it were a large ship like an aircraft carrier; (b) the hull did not have a sufficient measure of maneuverability; and (c) suitable controls were not available. Modern hydrofoil craft wherein the foils are either of the surface-piercing or of the submerged type, are much more maneuverable and stable than any other type of water craft and can take sharp turns at full speed.

Electronic contorls are much more sophisticated and precise to permit exact marrying of aircraft and the craft.

It will be apparent from the foregoing that the actual take-off and landing of the aircraft can take place away from densely populated areas and that the aircraft cannot run out of runway or overshoot it because the hull which forms the runway travels along with and under the aircraft as long as required for take-off and landing. Also, snow on runways will no longer be a problem since snow accumulation can be prevented on the craft and snow melts the moment it touches the water runway. The speed of take-off and landing can also be increased over what is possible on an airport runway since an aircraft can land on the hull in seconds after another has taken off and discharge of the landed craft occurs minutes after the hull docks and another outgoing craft may rapidly take its place.

A further object of the invention is far greater economy of landing areas than has ever been possible by the use of landing fields since a number of hulls can operate in a comparatively narrow stretch of water, including canals formed in marshland areas.

One feature of the invention includes a hull employing the hydrofoil principle and powered by jet engines. The hull is maneuverable like a ship and designed to attain speeds substantially equal to the take off and landing speeds of aircraft to facilitate the take off and landing of aircraft onto the hull with substantially no relative forward motion between the hull and the aircraft.

For a better understanding of the present invention together with other and further objects thereof reference is made to the following description taken in connection with the accompanying drawings in which:

FIG. 1 is a plan view of a hydrofoil landing craft of the present invention;

FIG. 2 is a side elevation of the landing craft of FIG. 1;

FIG. 3 is an elevation view of the stern of the craft;

FIG. 4 is an enlarged view partly in section of the cabin of the landing craft; and FIG. 5 is a sectional view taken along line 5—5 of FIG. 1.

A hull generally indicated 10 is provided with a top 12 substantially clear of upwardly projecting incumbrances to facilitate landing of aircraft thereon. A portion 14 of the top 12 is used as the landing strip. A hydraulically restrained arresting gear 16 is properly positioned on the landing strip 14 to restrain the forward movement of a plane landing thereon. Suitable jet engines 18, located astern, are employed to propel the ship.

The landing strip 14 is also suitably provided with lights 20 for night operation. The hull cross section is substantially rectangular to minimize rolling as best seen in FIG. 3. There are a plurality of hydrofoil elements 22 on each side of the hull to support the weight of the hull while skimming over the water at aircraft take off speeds. The hydrofoil elements are mounted on rugged, streamlined supporting struts 23 which may be retractable. The vertical angle of the hydrofoils is radar controlled by signals reflected from waves ahead of the moving hull to maintain an even movement on the water, said radar equipment not being shown.

The hydrofoil planes are preferably made of high strength steel having a leading edge 22A which would be extremely sharp so that at high speeds the foils could easily cut through floating debris or ice.

A conventional ship's rudder 24 and steering system is employed together with a standard set of propellers 26 driven by a conventional motor (not shown) for use when the hull is taxiing into position.

The landing strip or platform 14 is resiliently supported against the shock of landing aircraft by any suitable means such as the hydraulic cylinders 30 positioned in a recess 32 within the top 12 below the landing strip 14. Suitable controls (not shown) are used for the proper functioning of these hydraulic cylinders 30. The arresting gear 16 can be controlled in any suitable manner such as the hydraulic system generally indicated 34, FIG. 5, which is also housed beneath the cover plates 36 secured to the top 12.

A plurality of rows of exhaust ports 38 are located beneath the forward portion of the hull through which air is released to help decrease water friction while building up to foil borne speeds.

A control room 40 is provided in the forward portion of the hull. This is furnished with all navigational equipment (not shown) and an access door 42 leading to the top 12, is also provided with windows 44 all round to facilitate maneuvering the hull as best seen in FIG. 4.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed:

1. A water-borne, mobile aircraft landing and take-off craft of a size to receive and carry only one aircraft at one time and comprising an elongated hydrofoil hull having a recess in its central upper section, a landing platform within said recess and generally flush with the top of the hull, resilient means within the hull supporting said platform, an aircraft speed arresting gear on said platform, a plurality of hydrofoil elements supported by the hull in spaced relation thereto, means for propelling the hull at a speed equal to aircraft landing and take-off speed.

2. A water-borne, mobile aircraft landing and take-off craft of a size to receive and carry only one aircraft at one time comprising an elongated hydrofoil hull having a recess in its central upper section, a landing platform within said recess and generally flush with the top of the hull, hydraulic cylinders within the hull supporting said platform, an aircraft speed arresting assembly on said platform for transferring forward thrust of one of the craft to the other, a plurality of hydrofoil elements secured to the hull in spaced relation thereto, and jet means for propelling the hull at a speed equal to aircraft landing and take-off speed.

3. A water-borne mobile aircraft landing and take-off craft comprising an elongated hull of a size to receive, carry and service one aircraft at one time, a resilient landing and take-off platform on said hull which is generally flush with the top thereof, wheel roll restraining means, a plurality of hydrofoil elements and jet engines for propelling the hull at a speed generally equal to aircraft landing and take-off speed, and a plurality of ports in the forward section of the hull located below the water line when the craft is moving at slow speed, through which compressed air is released in order to decrease water friction while building speeds equal to the landing and take-off of the aircraft.

References Cited by the Examiner

UNITED STATES PATENTS

| | | | |
|---|---|---|---|
| 2,399,461 | 4/46 | Brown | 244—114 X |
| 2,784,925 | 3/57 | Goodhart | 244—114 |
| 2,890,671 | 6/59 | Hobday | 114—66.5 |
| 2,923,504 | 2/60 | Ortega et al. | 244—114 |
| 3,128,066 | 4/64 | Bailey | 244—114 |
| 3,141,436 | 7/64 | Cathers et al. | 114—67 X |

FOREIGN PATENTS 824,885   11/57   France.

MILTON BUCHLER, *Primary Examiner.*

FERGUS S. MIDDLETON, *Examiner.*